Figure 1:
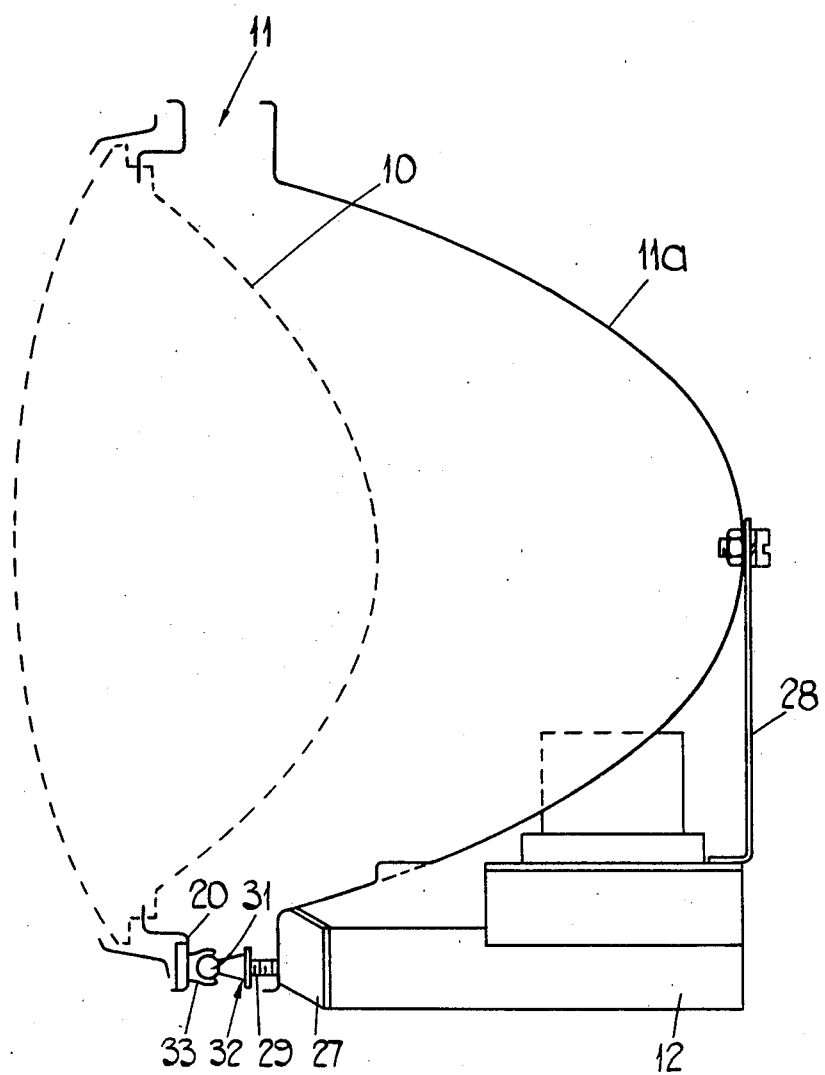

United States Patent [19]

Cunnell et al.

[11] 4,197,491
[45] Apr. 8, 1980

[54] HEADLAMP LEVELLING SYSTEM

[75] Inventors: Michael D. Cunnell, Salisbury; John S. Forrester, Halesowen, both of England

[73] Assignee: Lucas Industries Limited, Birmingham, England

[21] Appl. No.: 961,790

[22] Filed: Nov. 17, 1978

Related U.S. Application Data

[63] Continuation of Ser. No. 713,735, Aug. 11, 1976, abandoned.

[30] Foreign Application Priority Data

Aug. 21, 1975 [GB] United Kingdom ............... 34717/75
Aug. 21, 1975 [GB] United Kingdom ............... 34719/75

[51] Int. Cl.² ............................................. B60Q 1/02
[52] U.S. Cl. .............................. 318/673; 307/10 LS; 315/77; 315/82
[58] Field of Search ................... 307/10 LS; 318/673; 315/77, 82

[56] References Cited

U.S. PATENT DOCUMENTS

| | | | |
|---|---|---|---|
| 2,876,384 | 3/1959 | Brown | 318/673 |
| 3,395,323 | 7/1968 | Peters | 318/673 X |
| 3,437,895 | 4/1969 | Peters | 318/673 X |
| 3,614,574 | 10/1971 | Hodges | 318/673 X |
| 3,856,997 | 12/1974 | Kilkes | 200/14 X |
| 3,909,691 | 9/1975 | Wilson et al. | 318/673 X |
| 4,162,424 | 7/1979 | Zillaitt et al. | 307/10 LS |

Primary Examiner—B. Dobeck
Attorney, Agent, or Firm—Ladas, Parry, Von Gehr, Goldsmith & Deschamps

[57] ABSTRACT

A headlamp levelling system for a road vehicle, comprises an electric motor which, in use, drives a member coupled to the headlamp so as to allow the headlamp to be adjusted in a manner to vary the direction of the light beam emitted, in use, by the headlamp. The motor is connected across the terminals of an electrical supply by way of an electrical circuit including switch means and a plurality of spaced pairs of electrical contacts. The switch means has a plurality of switch positions, one for each of said pairs of contacts, and a bridging member is associated with said pairs of contacts. The contacts and the briding member undergo relative movement in response to movement of said driven member so that the bridging member bridges said pairs of contacts, in turn, in respective discrete positions of the driven member and hence of said headlamp. The electrical circuit is arranged so that when said switch means is moved from one switch position to a further switch position, current is fed from said supply to said motor to move said driven member until said bridging member bridges the pair of contacts associated with said further switch position, whereupon the supply of current to the motor is terminated.

8 Claims, 8 Drawing Figures

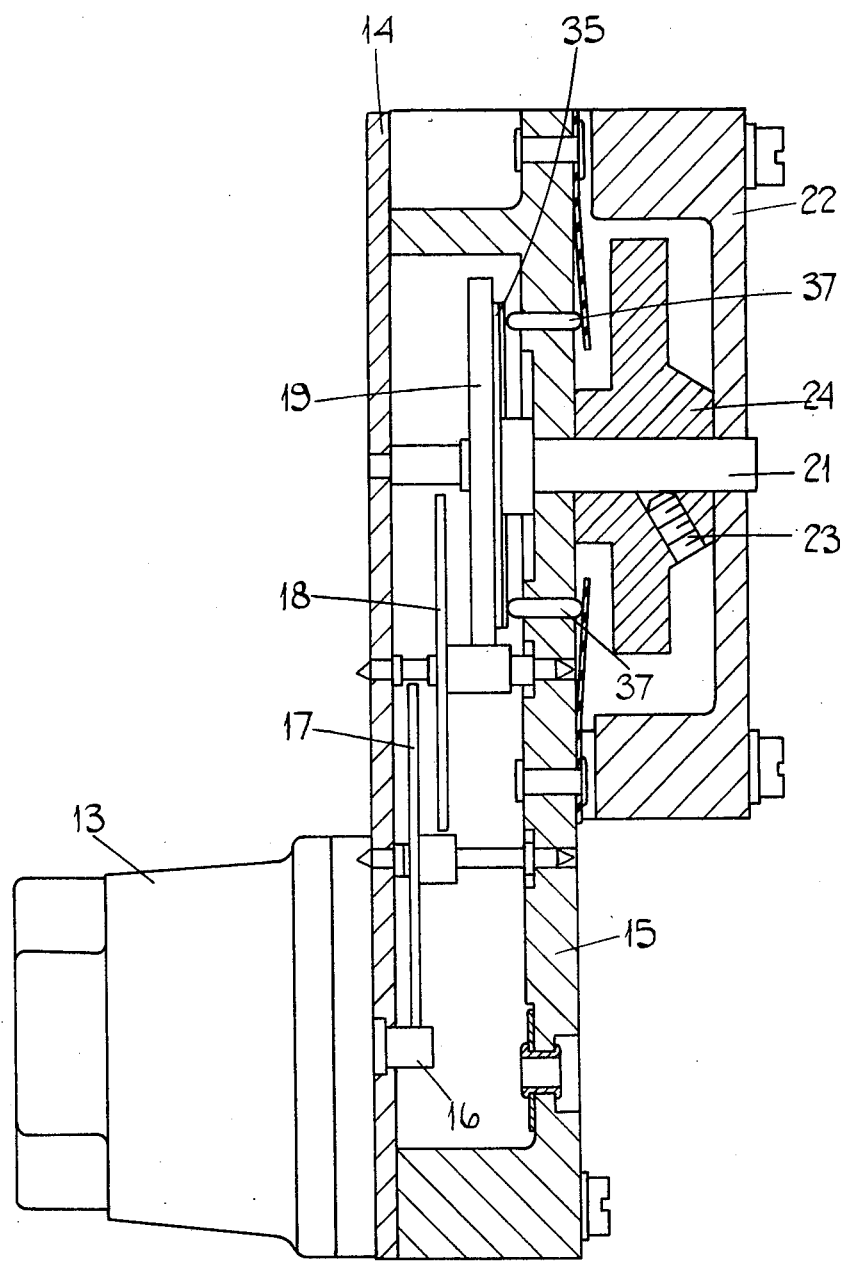

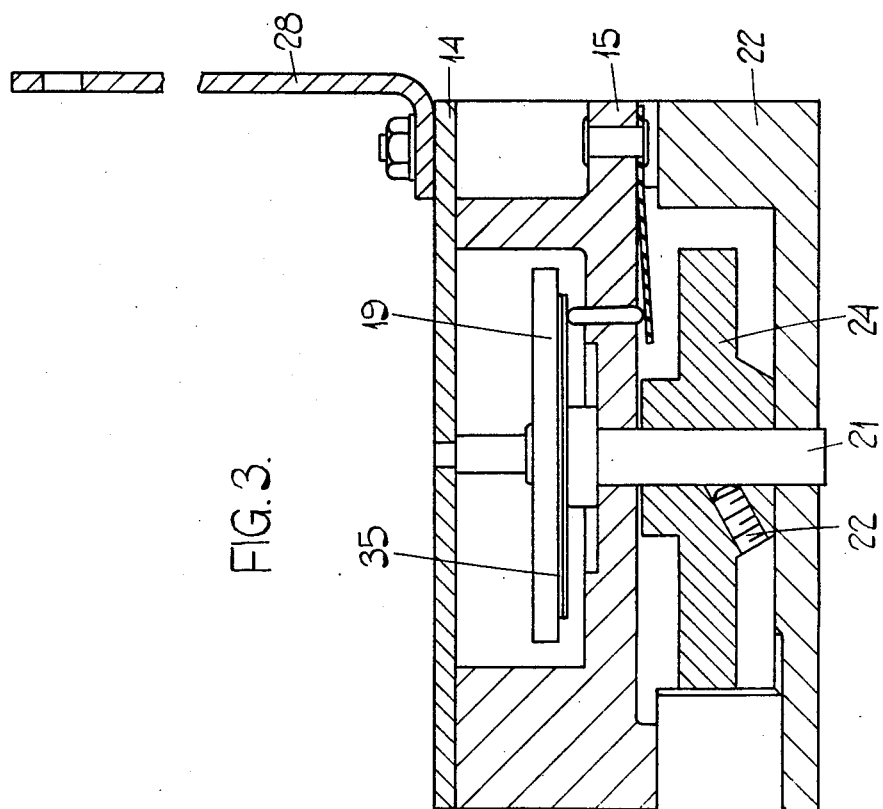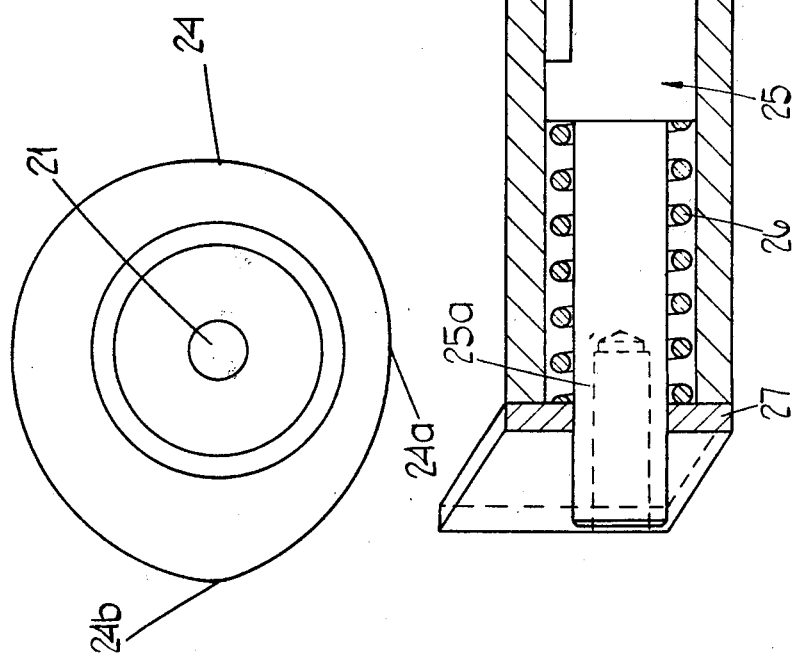

HEADLAMP LEVELLING SYSTEM

This is a continuation of application Ser. No. 713,735 filed Aug. 11, 1976 now abandoned.

This invention relates to a headlamp levelling system for a road vehicle.

A system, according to the invention, comprises an electric motor which, in use, drives a member coupled to the headlamp so as to allow the headlamp to be adjusted in a manner to vary the direction of the light beam emitted, in use, by the headlamp, an electrical supply across the terminals of which the motor is connected by way of an electric circuit including switch means and a plurality of spaced pairs of electrical contacts, the switch means having a plurality of switch positions, one for each of said pairs of contacts, and a bridging member associated with said pairs of contacts, the contacts and the bridging member undergoing relative movement in response to movement of said driven member so that the bridging member bridges said pairs of contacts, in turn, in respective discrete positions of the driven member and hence of said headlamp, and the electrical circuit being arranged so that when said switch means is moved from one switch position to a further switch position, current is fed from said supply to said motor to move said driven member until said bridging member bridges the pair of contacts associated with said further switch position, whereupon the supply of current to the motor is terminated.

Preferably, said plurality of pairs of electrical contacts is defined by a common first contact and a plurality of second contacts.

Preferably, the bridging member is movable by said driven member and said pairs of contacts are fixed.

Conveniently, the switch means includes a plurality of normally open switches one of which is closed in each of said switch positions, the bridging member being formed of conductive material but including an insulating portion which, after the switch means has been moved to close one of said switches, serves to terminate the supply of current to the motor when said portion moves into engagement with one or both of the contacts associated with said one switch.

Alternatively, the switch means includes a plurality of normally closed switches one of which is open in each of said switch positions, the bridging member being formed of insulating material and including a conductive portion which bridges said pairs of contacts in turn whereby, when the switch means is moved to open one of said switches, current can flow to the motor until the conductive portion bridges the contacts associated with said one switch.

Preferably, the electrical circuit includes further switch means operable to reverse the connections between the motor and the terminals of the electrical supply and thereby reverse the direction of movement of the driven member, when the first mentioned switch means is moved from one switch position to a further switch position after its preceding movement had been from said further position to said one position.

Figure 5:
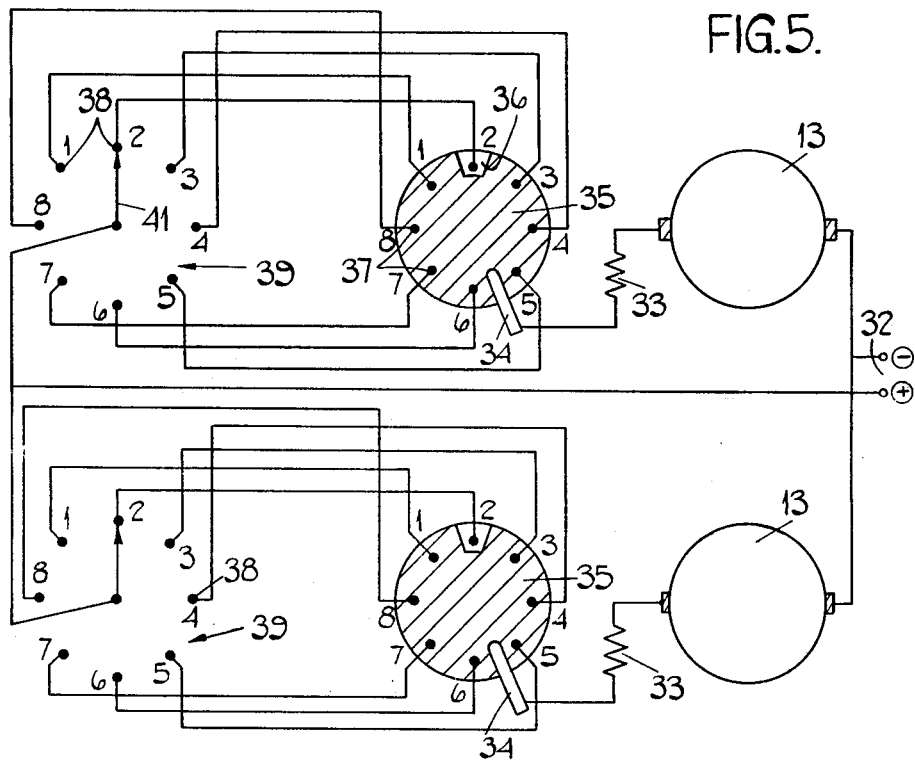
Figure 6:
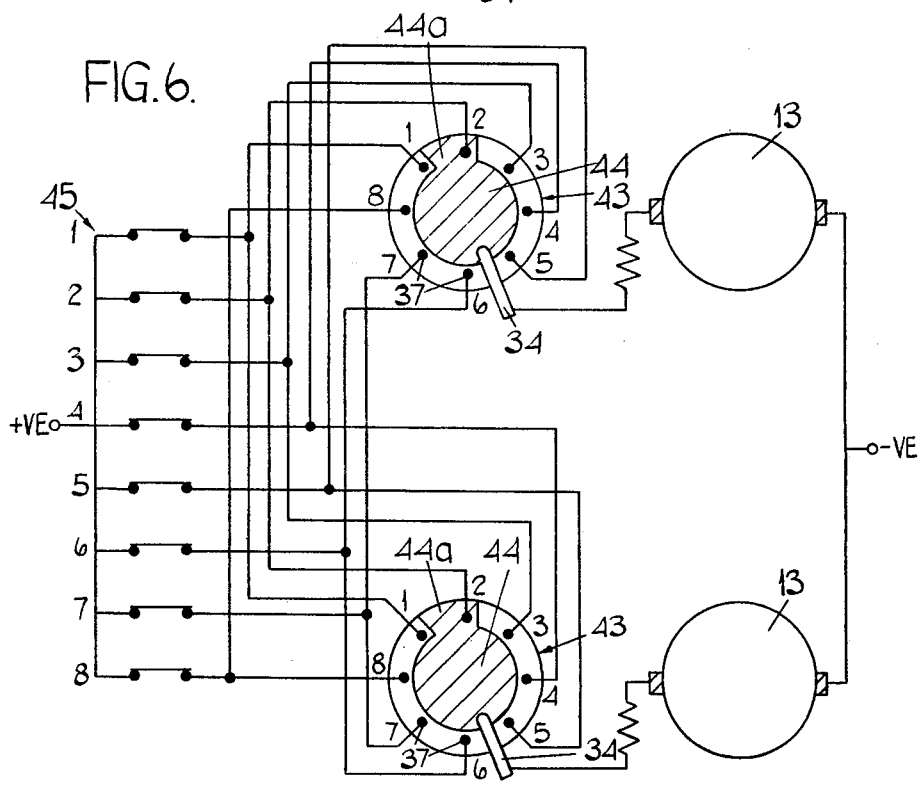
Figure 7:
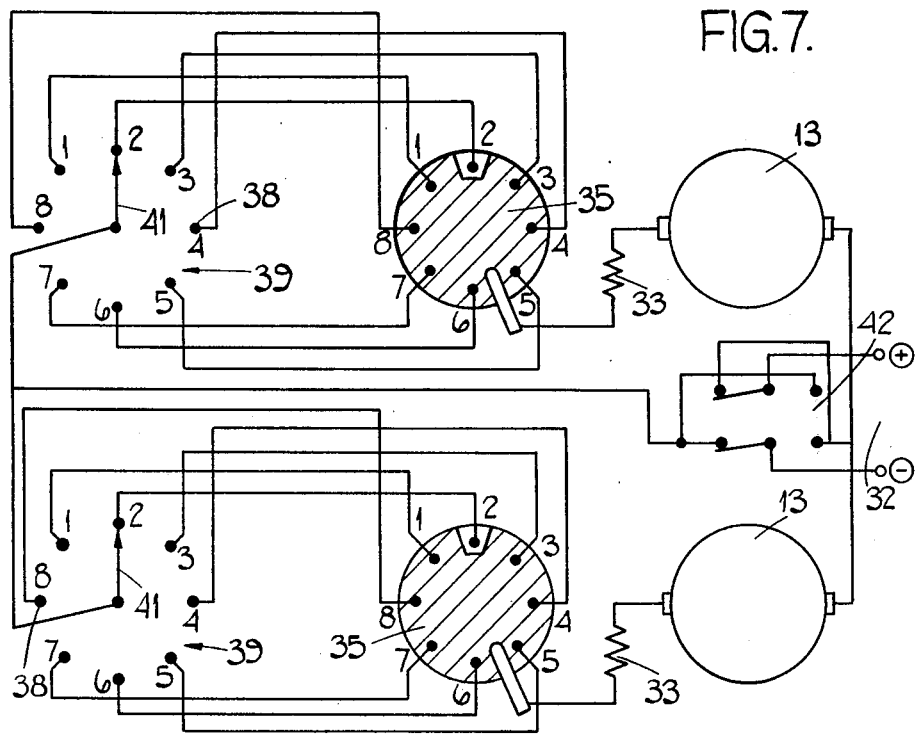
Figure 8:
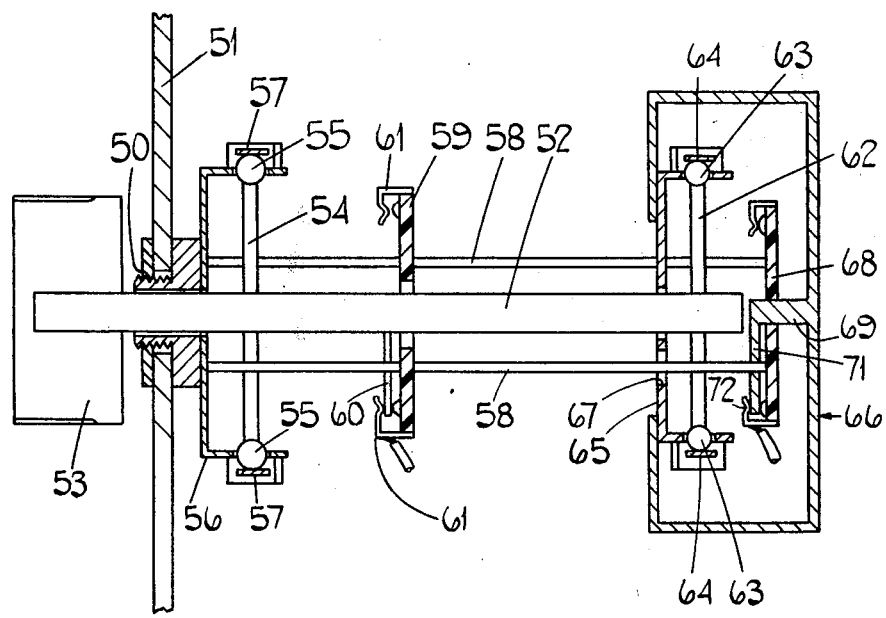

In the accompanying drawings:

FIG. 1 is a part-sectional side view of a system according to one example of the invention, FIGS. 2 and 3 are sectional views of part of the system shown in FIG. 1, FIG. 4 is a plan view of the cam shown in section in FIGS. 2 and 3, FIG. 5 is a circuit diagram of the system shown in FIG. 1, FIG. 6 is a circuit diagram of a system according to a modification of said one example, FIG. 7 is a circuit diagram of a system according to a further modification, and FIG. 8 is a part-sectional diagrammatic illustration of an electrical switch assembly for use in yet a further modification.

Referring to FIGS. 1 to 5, there is shown a system for adjusting the inclination of the light beam emitted by the light unit (shown as the dotted line 10 in FIG. 1) of each of a pair of road vehicle headlamps, one of which is shown in part at 11 in FIG. 1. The system includes separate, identical actuator mechanisms 12 associated with the light units respectively, each mechanism 12 including an electric motor 13 which is secured to the external surface of a cover plate 14 closing a gearbox casing 15. In use, the motor 13 rotates a splined shaft 16 which extends through the cover plate 14 into meshing engagement with a first gear wheel 17 which is rotatably mounted in the casing 15. The gear wheel 17 defines with second and third gear wheels 18,19 respectively a gear train which is arranged so that, in use, the wheel 19 rotates at a substantially reduced rate as compared with the rate of rotation of the shaft 16.

The gear wheel 19 is mounted on a stepped shaft 21 which is journalled for rotation in the cover plate 14, the casing 15 and a housing 22 which is mounted on the external surface of the casing 15 remote from the cover plate 14. Secured to the shaft 21 by way of grub screws 23 is an eccentrically mounted cam 24 against which an elongated cam follower 25 is urged by a spring 26. At its end remote from the cam 24, the follower 25 includes an internally screw-threaded portion 25a which projects through a bracket 27 secured to the housing 22. At each of its opposite ends, the bracket 27 is bolted to a rim portion of the headlamp body 11a which houses the light unit 10 with which the particular actuator mechanism 12 is associated, while a further bracket 28 secured to the cover plate 14 is bolted to the rear of the body 11a.

Engaged in the portion 25a of the cam follower 25 is a screw-threaded shaft 29 (FIG. 1) which at its free end carries the ball portion 31 of a ball and socket unit 32. The socket portion 33 of the unit 31 is carried by a first portion of the back-seating rim 20 of the associated light unit 10, while a second portion (not shown) of the rim 20, located generally vertically above said first portion, is pivotally connected to the body 11a. Thus, in use, when the motor 13 is energised so that the pinion 16 drives the cam 24 by way of the gear train 17, 18 and 19 the cam follower 25 moves said first portion of the rim 20 linearly in a direction either towards or away from the body 11a. The light unit 10 is thereby caused to pivot about said second portion of the rim 20 so as to adjust the inclination relative to the vehicle attitude of the light beam emitted, in use, by the light unit 10.

As is shown in FIG. 4, the shape of each cam is such that as it is moved from a minimum displacement position 24a to a maximum displacement position 24b the degree of movement imparted to its follower 25, and hence to the associated light unit 10, varies in direct proportion with the angular position of the cam 24. Thus, by controlling operation of each motor 13, it is possible to move each cam 24 between a plurality of discrete angular positions corresponding to various orientations of each light unit 10 to its associated body 11a. The way in which this control is effected is shown in FIG. 5, from which it will be seen that the motors 13 are provided with identical control circuits connected between the terminals of a common electrical supply 32 i.e. the vehicle battery.

Thus, referring to FIG. 5, each motor 13 is connected at one side to the negative terminal of the supply 32, and at its other side is connected by way of a resistor 33 to a first fixed contact 34. Each contact 34 engages a respective circular bridging member 35 which is formed of conductive material but is provided at its periphery with an insulating portion 36. Each member 35 is carried by one of the gear wheels 19 (see FIGS. 2 and 3) for angular movement therewith and is also engaged by a plurality of second fixed contacts 37 (two shown in FIG. 2) which are equi-angularly spaced around a circle concentric with the bridging member 35 and of diameter such that the contacts 37 lie in the path of movement of the insulating portion 36. Moreover, each of the contacts 37 is connected to a respective fixed contact 38 of a manually operable, multiposition, rotary switch which has its movable contact 41 connected to the positive terminal of the supply 32. Conveniently, although a separate switch 39 is provided for each motor 13, both switches 39 would normally be mounted to include a common operating member.

As will be seen from FIG. 5, each switch 39 can be considered as including a plurality of normally open sets of switch contacts (defined by the contacts 38,41), one of which is closed in each angular position of the switch operating member. Thus, in each position of the switch 39 energising current for the associated motor 13 can flow from the source 32 by way of the closed contact 38, the associated second contact 37, the bridging member 35 and the first contact 34, provided the insulating portion 36 is spaced from said second contact 37. The motor will therefore then operate so that the cam 24 and follower 25 are driven by the gear wheel 19 to tilt the associated light unit 10 until the bridging member 35, as it moves angularly with the gear wheel 19, reaches the position in which the insulating portion 36 engages said second contact 37. Current can then no longer flow to the motor and hence movement of the cam 24 and the light unit 10 will cease. It will therefore be appreciated that movement of the switch 39 between its various switch positions serves to operate its associated motor 13 to move the associated light unit 10 between a plurality of orientations, each corresponding to a respective discrete angular position of the member 35 and each providing a different orientation to the vehicle of the light beam emitted by the light unit in use.

Referring to FIG. 6, the system shown therein is basically the same as that described with reference to FIGS. 1 to 5, except that in this modification each bridging member, now indicated by the numeral 43, is an insulating component provided with a conductive region 44. The region 44 permanently engages the contact 34 and includes an arcuate area 44a which subtends an angle greater than the angular spacing between adjacent contacts 37 and which engages each of the contacts 37 in turn as the member 43 moves angularly with the associated gear wheel 19. Moreover, the manually operable switch, now indicated at 45, is defined by a plurality of normally closed sets of switch contacts, one of which is open in each operating position of the switch 45. Thus when the switch 45 is moved to open a given set of said switch contacts, current flows to operate the motors 13 until each bridging member 44 reaches a position in which the conductive region engages the contact 37 connected to said set of open switch contacts, whereby the supply of current to the motors is terminated.

Referring to FIG. 7, in the further modification shown therein the control circuits associated with the headlamp adjustment mechanisms are the same as those shown in FIG. 5 but are now connected to the terminals of the supply 32 by way of a common manually operable reversing switch 42. The switch 42 is separate from the switches 39 and is operated by the driver of the associated vehicle when, for example, the contact 41 is to be moved in a clockwise direction, after previously having been moved in an anti-clockwise direction. Operation of the switch 42 serves to reverse the connections between the motors 13 and the electrical supply 32 and hence allows the light units of the headlamps to be moved in one direction between a pair of adjacent positions, and then immediately back again in the opposite direction without the necessity for each motor moving its associated light unit through the complete cycle of its possible positions.

Referring to FIG. 8, in this yet further modification the system is similar to that shown in FIG. 7, but now employs a single, manually operable switch assembly to not only control operation of the motors 13 to adjust the headlamp light units 10, but also to provide a mechanism for reversing the connections between the motors 13 and the terminals of the supply 32. As shown in FIG. 8, the switch includes a single, cylindrical operating member 52 which is mounted in an aperture in a fixed support plate 51 for angular movement about its axis relative to the plate 51. The member 52 extends through the aperture in the plate 51 and is rigidly connected to an operating knob 53 adjacent one side of the plate 51 which, in use, will be presented to the driver of the associated vehicle and to a first toothed wheel 54 adjacent the opposite side of the plate. Co-operating with the toothed wheel 54 at diametrically opposite sides respectively thereof are a pair of balls 55 which are carried by a fixed support bracket 56, the latter being secured to the plate 51 by a nut and bolt assembly 50. Each ball 55 is urged into engagement with the toothed peripheral edge of the wheel 54 by a respective leaf spring 57 carried by the bracket 56. Thus, the wheel 54, balls 55 and springs 57 together define a detent mechanism for releasably retaining the operating member 52 in a plurality of angular positions in each of which the balls 55 are urged by their respective springs 57 between respective adjacent teeth of the wheel 54.

Extending from the bracket 56 parallel with the member 52 are a pair of fixed rods 58 which are positioned on opposite sides respectively of the member 52 and which support intermediate their ends a fixed, insulating contact carrier 59. Disposed around the periphery of the carrier 59 are a plurality of pairs of fixed contacts 61 between which is movable a conductive bridging member 60 carried by the operating member 52. The arrangement of the switch is then such that in each angular position of the operating member, as defined by the detent mechanism 54, 55 and 57, the bridging member 60 completes an electrical circuit between a respective pair of the fixed contacts 61. Moreover, it is to be appreciated that the contacts 61 constitute the fixed contacts 38 of both of the switches 39 in the system shown in FIG. 7, while the member 60 is equivalent to the movable contacts 41 of the switches 39.

At the end of the operating member 52 remote from the knob 53, the switch assembly includes a further detent mechanism defined by a toothed wheel 62 rigidly mounted on the member 52 and a pair of balls 63 urged by respective leaf springs 64 into engagement with the toothed peripheral edge of the wheel 62. The teeth of the wheel 62 are aligned with the teeth of the wheel 54, while the balls 63 and springs 64 are carried by a plate 65 which is mounted for angular movement on the member 52 and which forms part of a carrier assembly 66. Formed in the plate 65 are a pair of slots 67 (only one shown), each of which extends along an arc centred on the axis of the member 52 and receives one of said rods 58 as a sliding fit. At their ends extending beyond the plate 65, the rods 58 are secured to a further, insulating contact carrier 68 which is rotatably mounted on a spindle 69 defined by the assembly 66 and co-axial with the member 52. Carried by the spindle 69 is a further conductive bridging member 71 which is movable with the spindle, in the manner to be described below, to complete electrical circuits between two further spaced pairs of fixed contacts 72 provided at the periphery of the carrier 68. The member 71 and the contacts 42 together define the switch which is operable to reverse the connections to the motors 13 and which is therefore equivalent to the switch 42 in the system of FIG. 7.

As stated above, when the knob 53 is rotated, in use, the operating member 52 is moved angularly against the action of the springs 57 between a plurality of operative positions in which the bridging member 60 completes electrical circuits between respective sets of the contacts 61. It will, however, be appreciated that angular movement of the member 52 is also opposed by the springs of further detent mechanism 62,63, 64. Hence, depending upon the position of the rods 58 relative to their respective slots 67, the carrier assembly 66 will either be coupled by the further detent mechanism for movement with the operating member 52 or will be held against movement relative to the operating member. Thus, if the position of the rods 58 is such as to permit movement of the walls of the slots 67 upon angular movement of the operating member 52, then the carrier assembly 66 will move with the operating member 52 while the balls 63 are held by the springs 64 stationary relative to the wheel 62. In this way, the bridging member 71 can be moved angularly between the pairs of contacts 72 to reverse the connections to the motors 13, the arrangement being such that the angular movement of the operating member 52 required to effect this reversal is sufficient to move the assembly 66 relative to the rods 58 over the complete length of the slots 67. Further movement of the assembly 66 in the same direction will therefore be prevented by each rod 58 abutting against one end of its associated slot 67 and hence during continued movement of the member 52 the balls 63 will be moved by the wheel 62 so as to be engaged between respective adjacent teeth of the wheel in the various angular positions of the switch. Of course, if the operating member 52 is then moved in the opposite direction the assembly 66 will again move with the operating member until the rods 58 abut against the opposite ends of their respective slots 67, thereby returning the reversing switch to its original position.

It is to be appreciated that the switch assembly shown in FIG. 8 could readily be modified for use in the system of FIG. 6.

Further it is to be appreciated that although the above examples have employed one motor 13 for each light unit 10, as an alternative a single motor could have been used to operate mechanically interconnected means associated with both light units.

We claim:

1. A headlamp levelling system for a road vehicle, comprising a two terminal d.c. electric motor operable to drive a linearly movable member coupled to a headlamp for adjusting the headlamp in a manner to vary the direction of the light beam emitted by the headlamp; an electrical supply across the terminals of which the motor is connected by way of an electrical circuit including a plurality of spaced pairs of fixed electrical contacts and first and second switch means operated by a common operating member; and a rotatably mounted conductive bridging member associated with said pairs of fixed electrical contacts, the conductive bridging member undergoing rotational movement relative to said pairs of fixed electrical contacts in response to linear movement of said driven member so that, in each of a plurality of discrete positions of the driven member and hence said headlamp, the bridging member electrically connects all but a respective pair of said fixed contacts; the first switch means including a plurality of normally open switches, one for each of said pairs of contacts, and being movable between a plurality of switch positions in each of which one of said normally open switches is closed to supply current to the motor to move said driven member until it reaches the discrete position in which the pair of contacts associated with said closed switch are not electrically connected by the bridging member, whereupon the supply of current to the motor is terminated; and said second switch means being operable to reverse the connections between the motor and the terminals of the electrical supply when the first switch means is moved from one switch position to a further switch position after its preceding movement had been from said further position to said one position.

2. A system as claimed in claim 1, and further including a second two terminal d.c. electric motor operable to drive a second linearly movable member coupled to a second headlamp for adjusting the second headlamp in a manner to vary the direction of the light beam emitted by the second headlamp; said second motor being connected across the terminals of said electrical supply by way of an electrical circuit including a plurality of spaced further pairs of fixed electrical contacts and said first and second switch means; and a second rotatably mounted conductive bridging member associated with said further pairs of fixed electrical contacts, the second bridging member undergoing rotational movement relative to said further pairs of fixed electrical contacts in response to linear movement of said second driven member so that, in each of a plurality of discrete positions of the second driven member and hence said headlamp, the second bridging member electrically connects all but a respective pair of said further fixed electrical contacts; the first switch means including a plurality of further normally open switches, one for each of said further pairs of contacts, and being movable between a plurality of further switch positions in each of which one of said further normally open switches is closed so that said further closed switch serves to supply current to the second motor to move said second driven member until it reaches the discrete position in which the further pair of contacts associated with said further closed switch are not electrically connected by the second bridging member; and said second switch means being operable to reverse the connections between said second motor and the terminals of the electrical supply when the first switch means is moved from one switch position to a further switch position after its preceding movement had been from said further position to said one position.

3. A system as claimed in claim 1, wherein said first and second switch means form part of an electrical switch assembly including a fixed part, said common operating member being mounted for angular movement relative to the fixed part about an axis of the operating member; first contact means movable with the operating member to control in turn operation of the plurality of electrical switches of the first switch means; second contact means coupled to the operating member so as to be capable of a limited degree of angular movement with the operating member to control said second switch means; and fixed abutment means carried by the fixed part to prevent said second contact means undergoing more than said limited degree of angular movement, the arrangement being such that said operating member is movable relative to said second contact means, when the latter is held by said abutment means.

4. A system as claimed in claim 3, wherein the second contact means is supported by a carrier assembly including a plate formed with at least one arculate slot in which said abutment means is slidably received so that the opposite ends of the slot define the limits of the permitted angular movement of the second contact means.

5. A system as claimed in claim 4, wherein the carrier assembly is mounted on the operating member for angular movement relative thereto and supports a fixed component of a detent mechanism for releasably retaining the operating member in a plurality of spaced angular positions, the movable component of the detent mechanism being rigidly connected to the operating member so that the detent mechanism serves to couple the carrier assembly to the operating member during said limited degree of angular movement of the second contact means.

6. A system as claimed in claim 5, wherein the fixed component of the detent mechanism is defined by a spring-urged ball and the movable component is defined by a toothed wheel, said ball being urged between successive adjacent teeth of the wheel in said angular positions respectively of the operating member.

7. A headlamp levelling system for a road vehicle, comprising a two terminal d.c. electric motor operable to drive a linearly movable member coupled to a headlamp for adjusting the headlamp in a manner to vary the direction of the light beam emitted by the headlamp; an electrical supply across the terminals of which the motor is connected by way of an electrical circuit including switch means and a plurality of spaced pairs of fixed electrical contacts; and a rotatably mounted conductive bridging member associated with said pairs of contacts, the bridging member undergoing rotational movement relative to said contacts in response to linear movement of said driven member so that, in each of a plurality of discrete positions of the driven member and hence the headlamp, the bridging member electrically connects a single, different pair of said electrical contacts; said switch means including a plurality of normally closed switches, one for each of said pairs of contacts, and being movable between a plurality of switch positions in each of which one of said normally closed switches is open so that when the switch means is moved to open one of said switches, current can flow to the motor to move the driven member until the bridging member electrically connects the pair of contacts associated with said open switch, whereupon the supply of current is terminated.

8. A system as claimed in claim 7, and further including a second two terminal d.c. electrical motor operable to drive a second linearly movable member coupled to a second headlamp for adjusting the second headlamp in a manner to vary the direction of the light beam emitted by the second headlamp; said second motor being connected across the terminals of said electrical supply by way of a further electrical circuit including said switch means and a plurality of spaced further pairs of fixed electrical contacts; and a second rotatably mounted bridging member associated with said further pairs of electrical contacts, the second bridging member undergoing rotational movement relative to said further pairs of electrical contacts in response to linear movement of said second driven member so that, in each of a plurality of discrete positions of the second driven member and hence said second headlamp, the second bridging member electrically connects a single different pair of said further electrical contacts; said further electrical circuit connecting each of said normally closed switches of the switch means to a respective further paid of electrical contacts so that when the switch means is moved to open one of said switches, current can flow to the second motor to move said second driven member until the second bridging member electrically connects the further pair of contacts associated with said open switch.

* * * * *